US008536498B2

(12) United States Patent
Hirota

(10) Patent No.: US 8,536,498 B2
(45) Date of Patent: Sep. 17, 2013

(54) INDUCTION HEATING DEVICE FOR A METAL PLATE

(75) Inventor: Yoshiaki Hirota, Futtsu (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 890 days.

(21) Appl. No.: 11/884,312

(22) PCT Filed: Feb. 9, 2006

(86) PCT No.: PCT/JP2006/302675
§ 371 (c)(1),
(2), (4) Date: Aug. 14, 2007

(87) PCT Pub. No.: WO2006/088067
PCT Pub. Date: Aug. 24, 2006

(65) Prior Publication Data
US 2008/0264932 A1    Oct. 30, 2008

(30) Foreign Application Priority Data

Feb. 18, 2005  (JP) .................................. 2005-041944
Sep. 5, 2005   (JP) .................................. 2005-256334

(51) Int. Cl.
*H05B 6/36*    (2006.01)
*B05C 13/00*   (2006.01)

(52) U.S. Cl.
USPC ............ 219/672; 219/645; 219/653; 219/673; 219/635; 219/639; 118/500; 118/639; 118/715; 118/725; 118/732

(58) Field of Classification Search
USPC ................. 219/672, 645, 653, 673, 635, 639, 219/646, 670; 118/500, 639, 715, 725, 732
See application file for complete search history.

(56) References Cited

U.S. PATENT DOCUMENTS 2,448,009 A  *  8/1948  Baker ............................ 219/645
2,897,328 A     7/1959  Alf et al.
(Continued)

FOREIGN PATENT DOCUMENTS

DE   18 03 129 A1   4/1970
GB   932602         7/1963
(Continued)

OTHER PUBLICATIONS

JP2003-187950A.pdf machine translation.*
(Continued)

*Primary Examiner* — Henry Yuen
*Assistant Examiner* — Ket D Dang
(74) *Attorney, Agent, or Firm* — Birch, Stewart, Kolasch & Birch, LLP

(57) ABSTRACT

An induction heating apparatus for heating a traveling metal plate includes an induction coil for surrounding the metal plate. The induction coil includes an upper induction coil for being located above the metal plate and a lower induction coil for being located below the metal plate. The upper and lower induction coils are spaced from each other in a longitudinal direction of the metal plate a constant distance across a transverse direction of the metal plate. Each of the upper induction coil and the lower induction coil is arranged obliquely at an edge area of the metal plate so as to form an oblique angle with the transverse direction of the metal plate.

13 Claims, 11 Drawing Sheets

(56) References Cited

U.S. PATENT DOCUMENTS

| | | | |
|---|---|---|---|
| 2,902,572 A * | 9/1959 | Lackner et al. | 219/645 |
| 3,031,555 A * | 4/1962 | Ross et al. | 219/672 |
| 3,431,382 A * | 3/1969 | Esche et al. | 219/650 |
| 3,725,629 A * | 4/1973 | Vickers | 219/673 |
| 4,751,360 A | 6/1988 | Ross | |
| 4,778,971 A | 10/1988 | Sakimoto et al. | |
| 5,126,522 A * | 6/1992 | Katayama et al. | 219/663 |
| 5,336,868 A * | 8/1994 | Schluckebier | 219/675 |
| 2010/0155390 A1* | 6/2010 | Hirota | 219/645 |

FOREIGN PATENT DOCUMENTS

| | | |
|---|---|---|
| GB | 1015258 A | 12/1965 |
| JP | 51-41233 | 10/1976 |
| JP | 63-252382 A | 10/1988 |
| JP | 4-147596 A | 5/1992 |
| JP | 11-61277 A | 3/1999 |
| JP | 2002-43042 A | 2/2002 |
| JP | 2002-151245 A | 5/2002 |
| JP | 2003-187950 A | 7/2003 |
| JP | 2003187950 A * | 7/2003 |
| JP | 2004-296368 A | 10/2004 |
| JP | 2005-209608 A | 8/2005 |

OTHER PUBLICATIONS

Office Action in Canadian Application No. 2,597,529 mailed Aug. 12, 2010.

Japanese Office Action, dated Jul. 27, 2010, for Japanese Application No. 2006-041678, with English language summary.

* cited by examiner

ARROW REPRESENTS
COIL CURRENT DIRECTION

INDUCTION HEATING DEVICE FOR A METAL PLATE

CROSS-REFERENCE TO RELATED APPLICATIONS

This nonprovisional application claims priority under 35 U.S.C. §119(a) on Patent Applications Nos. 2005-41944 and 2005-256334, filed in Japan on Feb. 18, 2005 and Sep. 5, 2005 respectively. The entirety of each of the above documents is incorporated herein by reference.

BACKGROUND OF THE INVENTION

1. Field of the Invention

The present invention relates to an induction heating apparatus for a metal plate such as a steel plate or an aluminum plate. The present invention particularly relates to an induction heating apparatus that heats a metal plate by generating an induced current therein using an induction coil surrounding the metal plate. The present invention also relates to an induction heating apparatus, which is capable of heating a metal plate with high efficiency irrespective of the thickness of the metal plate and irrespective of whether the metal plate is magnetic or non-magnetic. The present invention is further capable of restraining overheating at an edge area of the metal plate.

2. Description of the Related Art

An indirect heating apparatus using a gas or electricity, or a direct heating apparatus using induction heating has been used for heating a metal plate to control the quality of the metal material in the heat-treatment process. Since a direct heating apparatus has no thermal inertia, unlike an indirect heating apparatus, a direct heating apparatus can save the time which is required by an indirect heating apparatus to reach a stable furnace temperature, and can easily control the heating rate, for example, when a thickness of plate is changed. Therefore, a direct heating apparatus does not require changing of the metal plate transportation speed, which prevents productivity from being lowered.

There are two types of induction heating apparatus for a metal plate. One type is an LF type (Longitudinal Flux type), in which a metal plate is heated by generating a circular induced current therein in the cross-section using an induction coil, where an alternate current with a frequency ranging normally from 1 KHz to 500 KHz is applied, surrounding the metal plate. FIG. 1 shows a schematic diagram of an LF type induction heating apparatus. FIG. 2 illustrates a circular induced current generated in the cross-section using an LF type induction heating apparatus. In FIG. 1, an induction coil 2 connected to an AC power supply 3 surrounds a metal plate 1. When a primary current 5 is passed through the induction coil 2, a flux 4 penetrates the metal plate 1 to generate an induced current around the flux 4. In FIG. 2, an induced current 6 generated in the cross-section of the metal plate 1 flows in an opposite direction to the primary current 5 running through the induction coils 2 which are located above and under the metal plate 1, respectively. The other type is a TF type (Transverse Flux type), in which induction coils with a core are located above and under the metal plate respectively. When an AC power supply to the coils is turned on, a flux penetrates the metal plate between the cores in the plate thickness direction to generate an induced current, which leads to beating of the metal plate.

In TF type heating, the induced current concentrates on a lateral end area of the metal plate and at the same time the current density in the vicinity of the end area is lowered, which easily causes a non-uniform temperature distribution in a lateral direction after heating. In particular, it becomes more difficult to provide a uniform heating when the positional relationship between the core of the induction coil and the metal plate is changed by shifting a width of the metal plate or by a snaking of the metal plate. In the background art, a technology that uses a rhombus-shaped coil was proposed so that the flux can always penetrate over an entire width of the plate by tilting the rhombus-shaped coil when the width of the metal plate is changed. However, this technology uses by leakage flux from the induction coil, which requires the metal plate and the induction coil to be close to each other. In addition, installation of a rotation mechanism on the induction heating apparatus where a large amount of current is supplied increases the difficulty in carrying out the technology on industrial scale.

The LF type heating is a method for heating a metal plate surrounded by an induction coil, which can make sure that a circular induced current is generated in the metal plate so as to heat the plate. An induced current that is generated in the cross-section of the metal plate in an LF type is concentrated at the depth "d" expressed in the following expression:

$$d[\text{mm}] = 5.03 \times 10^{+5} \times (\rho/\mu_r f)^{0.5} \quad (1)$$

where d is the induced current penetration depth [mm], $\rho$ is the specific resistance [$\Omega$m], $\mu_r$ is the relative magnetic permeability, and f is the frequency [Hz] for heating.

An induced current penetration depth increases as a temperature of the metal increases because the specific resistance increases when the temperature of the metal increases. The relative magnetic permeability of ferromagnetic material or paramagnetic material decreases as the temperature becomes closer to the Curie point, and finally becomes 1 at a temperature above the Curie point. This means that the induced current penetration depth increases as the temperature increases. Since the relative magnetic permeability of a non-magnetic material is 1, its induced current penetration depth is larger compared to that of a magnetic material.

In LF type induction heating, if the induced current penetration depth is large and yet a thickness of the metal plate is thin, the induced current generated in an upper portion of the metal and the induced current generated in a lower portion of the metal cancel each other. This leads to heating that has a low efficiency.

For example, if a heating frequency of 10 KHz is used, the induced current penetration depth at room temperature is about 1 mm with aluminum of non-magnetic material, about 4.4 mm with stainless steel 304 (SUS304) and about 0.2 mm with steel of magnetic material. The current penetration depth of steel at temperature above the Curie point (at about 750° C.) is about 5 mm. Most steel plates for automobiles and home electric appliances, which are major commercial products that use metal plates, have a thickness of not more than 2 mm. Therefore, it is usually difficult to heat such metal plate with high efficiency without the induced currents in the upper and lower portions of the metal plate being canceled as mentioned above. It could be thought to increase the frequency of the AC current supplied to the LF type induction heating apparatus to several hundred KHz in order to make the depth of the induced current penetration shallower, so that canceling the induced currents can be avoided; however, it is not very practical to use a large current power source with such a high frequency on an industrial scale.

It has been proposed to use an induction heating apparatus that uses an induction coil surrounding a metal plate, which is capable of heating a metal plate with high efficiency even if the metal plate is at a high temperature and/or is a thin metal plate. In such induction heating apparatus, an induction coil located above the metal plate (upper induction coil) and another induction coil located below the metal plate (lower induction coil) are arranged parallel to each other, so as to be set respectively in different positions in a longitudinal direction of the metal plate. In other words, two projected images of the upper induction coil and the lower induction coil, which are respectively formed by vertically projecting the two induction coils onto the metal plate, are parallel to each other and in a different position in the longitudinal direction of the metal plate.

FIG. 3 is a schematic diagram of the above-mentioned induction heating apparatus where an induction coil 2a located above the metal plate 1 (upper induction coil) and another induction coil 2b located below the metal plate 1 (lower induction coil) are arranged parallel to each other and in a different position in the longitudinal direction of the metal plate. Reference numerals 7 and 8 represent a conductive member and an AC power supply 8, respectively. FIGS. 4A and 4B show the flow of the induced current in the metal plate 1 when the upper induction coil and the lower induction coil are arranged in a different position in the longitudinal direction of the metal plate. FIG. 4A is a schematic diagram illustrating the state of the induced current viewed from above the metal plate. FIG. 4B is a cross-sectional view taken on the line 4B-4B of FIG. 4A. Reference numeral 10 in FIG. 4A represents the flow of the induced current. When the upper induction coil and the lower induction coil are arranged so as to be set in a different position in the longitudinal direction of the metal plate, the upper path and the lower path of the circular induced current generated in the metal plate are also arranged to be set respectively in different positions in the longitudinal direction of the metal plate. Therefore, it makes it possible to heat the metal plate with high efficiency without cancellation of the induced currents in the upper and lower portions in the metal plate while the induced current penetration depth is large, even where the temperature of the metal plate is high and/or the metal plate is thin.

However, in the use of such an induction heating apparatus where the upper and lower induction coils are set in different positions in the longitudinal direction of the metal plate, an edge area of the metal plate in the width direction can become overheated compared to a central area of the metal plate in the width direction. This can result in a non-uniform temperature distribution as a finishing temperature in the transverse direction of the metal plate.

This phenomenon is experienced because a width of the induced current path in the edge area of the metal plate (corresponding to "d2" in FIG. 4a), where the current flows from an upper portion to a lower portion in the metal plate, is narrower than the induced current path in the upper and lower portions of the metal plate (corresponding to "d1" in FIG. 4A). Therefore, a current density in the edge area of the metal plate is higher than a current density in the central area. One reason for narrowing the current path in the edge area is that the current flowing in the edge area is to be shifted toward edge, so that the inductance between the induced current flowing in the edge area in the metal plate thickness direction and the primary current flowing through the induction coil arranged near the edge of the metal plate in the metal plate thickness direction can be lowered. Another reason for the overheating at the edge area is that the heating time at the edge area of the metal plate (defined as d3/(the traveling speed of the metal plate), where d3 is defined as in FIG. 4A) is longer than the heating time at the central area (defined as d1/(the traveling speed of the metal plate), where d1 is defined as in FIG. 4a).

Since a heat divergence by an induction heating apparatus is proportional to a square of the current density and the heating time, an edge area of the metal plate in the transverse direction is overheated compared to a central area of the metal plate in the use of such an induction heating apparatus where an upper induction coil and lower induction coil are respectively set in different positions so as to be away from each other in longitudinal direction of the metal plate.

SUMMARY OF THE INVENTION

An object of the present invention is to solve the problems of the background art induction heating apparatus mentioned above. An embodiment of the present invention is capable of heating a metal plate with high efficiency, even where the temperature of metal plate is high above the Curie point, the metal plate is thin and/or the metal plate is made of a non-magnetic, non-ferrous metal with a low specific resistance such as aluminum or copper. In addition, an embodiment of the present invention is capable of providing a metal plate with a more uniform temperature in the transverse direction of the metal plate, in particular preventing overheating at an edge area of the metal plate. An embodiment of the present invention can make it easier to realize a desired temperature distribution, even when the width of metal plate to be heated is changed, without preparing a plurality of induction coils to cope with the change in the width of the metal plate. An embodiment of the present invention can also improve a non-uniform temperature distribution caused by snaking of the metal plate. Another embodiment of the present invention provides a technology that has a great flexibility in the distance between the upper and lower induction coils, the width of the induction coils and the amount of heat divergence.

The above objects of the present invention can be accomplished by an induction heating apparatus for heating a traveling metal plate, comprising: an induction coil for surrounding the metal plate, said induction coil including an upper induction coil for being located above the metal plate and a lower induction coil for being located below the metal plate, said upper and lower induction coils being spaced from each other in a longitudinal direction of the metal plate a constant distance across a transverse direction of the metal plate, wherein each of the upper induction coil and the lower induction coil is arranged obliquely at an edge area of the metal plate so as to form an oblique angle with the transverse direction of the metal plate.

The above objects of the present invention can also be accomplished by an induction heating apparatus for heating a traveling metal plate, comprising: an AC power supply; an upper induction coil for being located above the metal plate, said upper induction coil being connected at one end thereof to the AC power supply; and a lower induction coil for being located below the metal plate, said lower induction coil being connected at one end thereof to the AC power supply, said lower induction coil being spaced from said upper induction coil in a longitudinal direction of the metal plate a constant distance across a transverse direction of the metal plate, wherein each of the upper induction coil and the lower induction coil includes at least one oblique portion at an edge area of the metal plate, said at least one oblique portion forming an oblique angle with the transverse direction of the metal plate.

In the present invention, a traveling metal plate is not limited to a metal plate traveling in one way, but includes reciprocating movement of the metal plate. In addition, in the present invention, an induction coil is a collective term that includes a coil formed by a tube, a wire, a plate or the like of an electric conductive material surrounding a metal plate by a single turn or more. In addition, surrounding the metal plate is not limited to a specific form such as circular or square. With regard to the materials for the electric conductor, low resistance materials such as copper, copper alloy or aluminum are preferable.

With regard to the metal plate of the present invention, a magnetic material such as steel, non-magnetic materials such as aluminum or copper and steel in a non-magnetic state at a high temperature above the Curie point are included.

In the present invention, the transverse direction of the metal plate means a direction perpendicular to a traveling direction of the metal plate. A longitudinal direction of the metal plate means the traveling direction of the metal plate.

In the present invention, an edge of the metal plate is an end of the metal plate in a transverse direction, and an edge area of the metal plate means an upper (top)/lower (bottom) surface of the metal plate close to or in the vicinity of the edge of metal plate.

In the present invention, a distance in the longitudinal direction between the induction coil located above the metal plate and the induction coil located below the metal plate is defined as a distance between the two projected images of the induction coil located above and the induction coil located below which are respectively formed by vertically projecting each induction coil onto the metal plate. FIG. 5 is a schematic diagram of a cross-section of an induction heating apparatus of the present invention in the longitudinal direction of a metal plate to be heated. Reference numeral 1 represents a cross-sectional view of a metal plate that extends in a longitudinal direction, reference numeral 2a represents a cross-sectional view of an induction coil located above the metal plate, reference numeral 2b represents a cross-sectional view of an induction coil located below the metal plate, reference numeral 30a represents a vertically projected image of the induction coil located above the metal plate, and reference numeral 30b represents a vertically projected image of the induction coil located below the metal plate. Hereinafter "an induction coil located above the metal plate" may be referred to as an "upper portion of induction coil" or simply an "upper induction coil", and "an induction coil located below the metal plate" may be referred to as a "lower portion of induction coil" or simply a "lower induction coil". A distance in the longitudinal direction between the upper and the lower induction coils is defined as "L" in FIG. 5. In the case where a width of the upper induction coil and a width of the lower induction coil are different, a starting point to determine the distance is an edge (end) of the vertically projected image of the wider induction coil.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4B is a cross-sectional view taken on the line 4B-4B of FIG. 4a;

DETAILED DESCRIPTION OF THE PREFERRED EMBODIMENT

The present invention will now be described with reference to the accompanying drawings. All of the drawings illustrate a single turn of the induction coil surrounding a metal plate. However, the number of turns of the induction coil in the present invention is not limited to a specific number.

Figure 6:
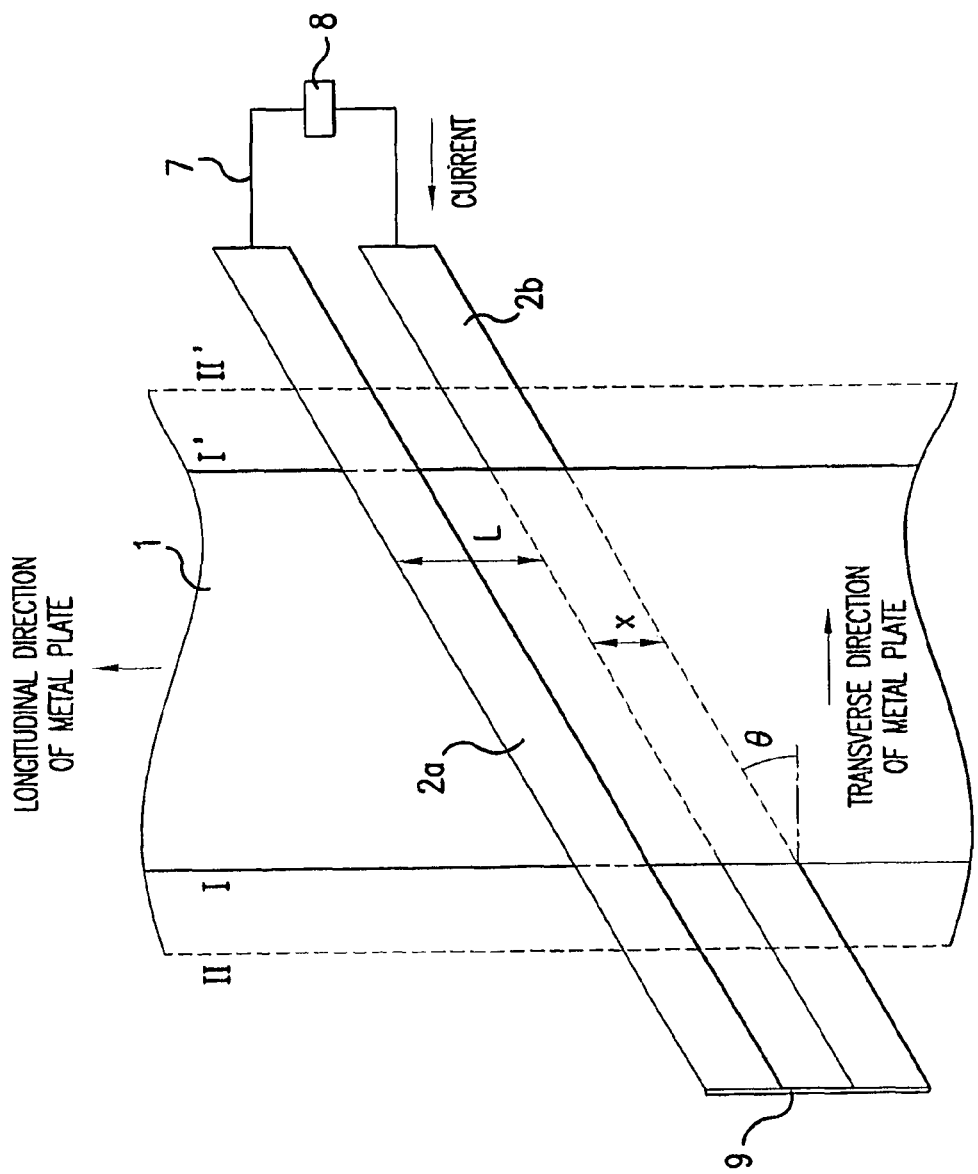
FIG. 6 is a schematic diagram of an embodiment of the present invention.

FIG. 6 is a plan view schematic diagram of an example of an induction heating apparatus of the present invention. In the present invention, an induction coil 2a located above the metal plate and another induction coil 2b located below the metal plate are located so as to be away from each other in the longitudinal direction of the metal plate and parallel to each other. A distance between the upper induction coil and the lower induction coil is defined as a distance between the two projected images of the upper induction coil and the lower induction coil, which are respectively formed by vertically projecting each induction coil onto the metal plate. A distance L, the above-defined distance, in the longitudinal direction between the upper and lower induction coils is kept constant in the transverse direction. Furthermore, the upper induction coil 2a and the lower induction coil 2b stretch obliquely across the metal plate at an edge area of the metal plate relative to the transverse direction. In other words, each of the upper induction coil 2a and the lower induction coil 2b is arranged obliquely at the edge area so as to have an oblique angle between each of the induction coils and the transverse direction of the metal plate. Reference numeral 7 represents a conductive member, 8 represents an AC power supply and 9 represents an induction coil located close to an edge (end) of the metal plate. Symbol θ represents an oblique angle defined as an angle between the induction coil at the edge area and the transverse direction of the metal plate. Symbol x represents a width of the induction coil in the longitudinal direction of metal plate.

When the upper induction coil and the lower induction coil are located so as to be away from each other in the longitudinal direction of the metal plate, an upper path and a lower path of the circular induced current generated in the metal plate are also arranged to be away from each other in the longitudinal direction of the metal plate. Therefore, it makes it possible to heat the plate with high efficiency without cancellation of the induced currents in the upper and lower portions in the metal plate while the induced current penetration depth is large, even where the temperature of the metal plate is high and/or the metal plate is thin.

The distance between the upper and lower induction coils can be determined based on the material of metal plate, the temperature of the metal plate and a gap between the induction coil and the metal plate to be heated. In order to effectively heat a steel sheet in a non-magnetic region at a temperature above the Curie point, it is preferable to set the distance between the upper and lower induction coils to be 0.2 to 6 times the width of the induction coil, and more preferably to set the distance to be 0.6 to 4 times the width of the induction coil, considering the width of the metal plate, the width of the induction coil and a traveling speed of the metal plate. If the distance is less than 0.2 times the width of induction coil, cancellation of the induced currents in upper portion and lower portions of the metal plate occurs, which fails to heat effectively. If the distance is more than 6 times the width of the induction coil, it becomes difficult to reduce a current density at the edge area of the metal plate and the heating time increases, which leads to a temperature increase at the edge area. In addition, the reactance increases, which requires a high voltage power supply, which is difficult to carry out on an industrial scale. Hereinafter, when a width of the upper induction coil and a width of the lower induction coil are different, a width (in the longitudinal direction of the metal plate), unless otherwise defined, represents the width of the wider induction coil.

Figure 1:
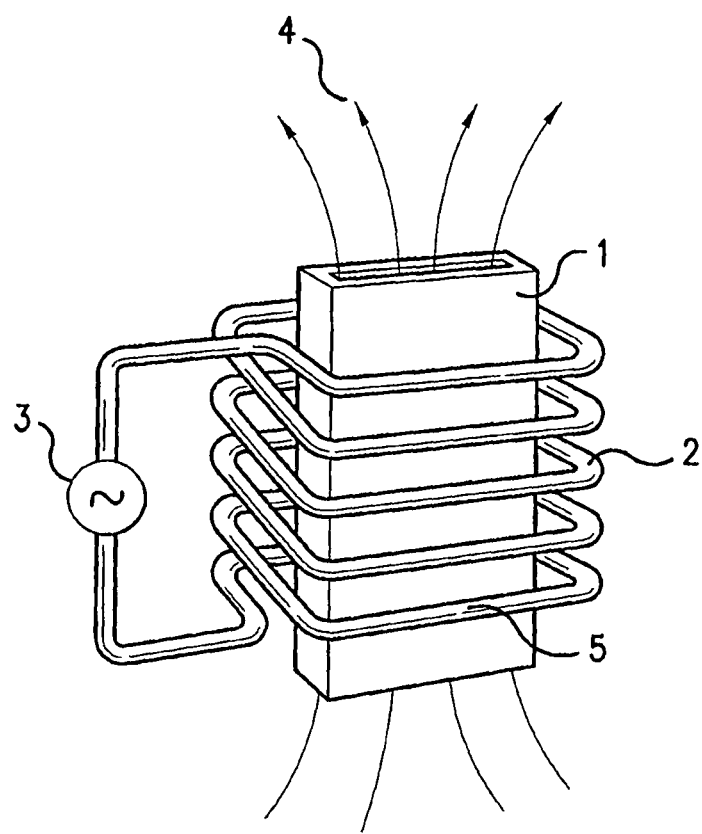
FIG. 1 is a schematic diagram of an LF type induction heating apparatus according to the background art.
Figure 2:
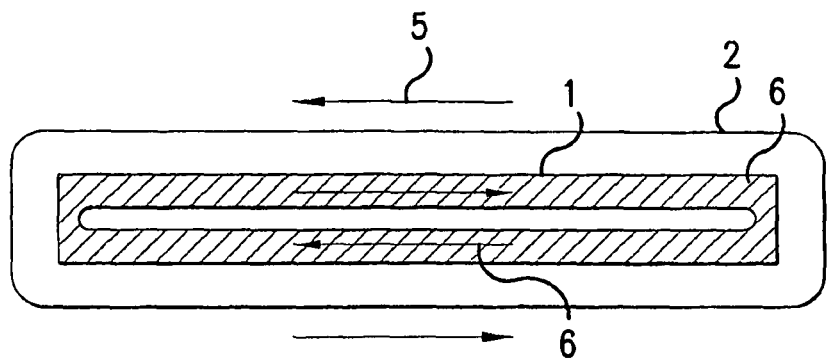
FIG. 2 illustrates a circular induced current generated in the cross-section of the metal plate in FIG. 1.
Figure 3:
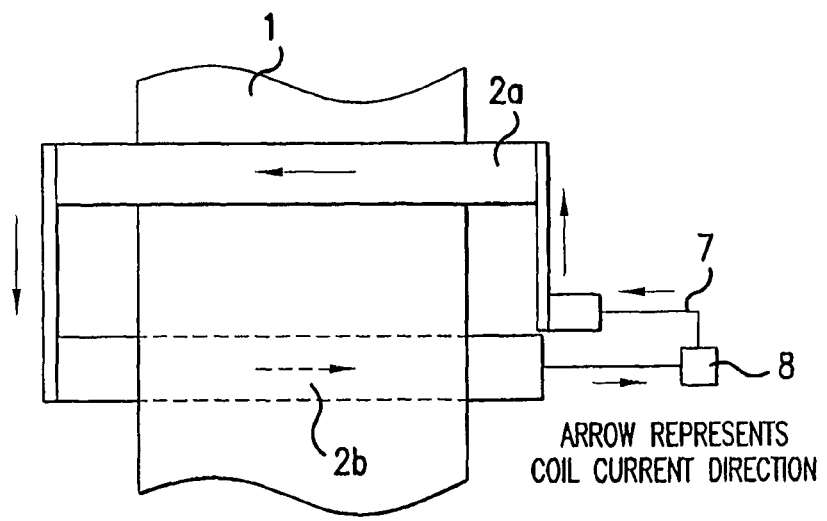
FIG. 3 is a schematic diagram of an induction heating apparatus according to the background art.
Figure 4A:
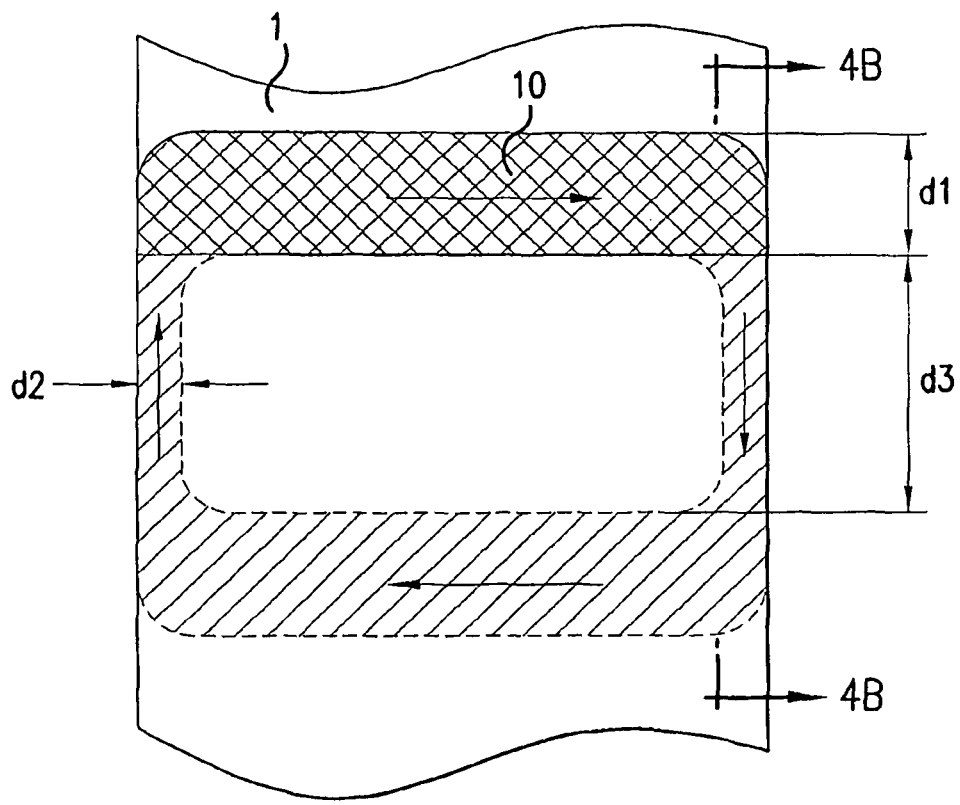
FIG. 4A is a schematic diagram illustrating the state of an induced current flow in a metal plate viewed from above the metal plate.
Figure 4B:
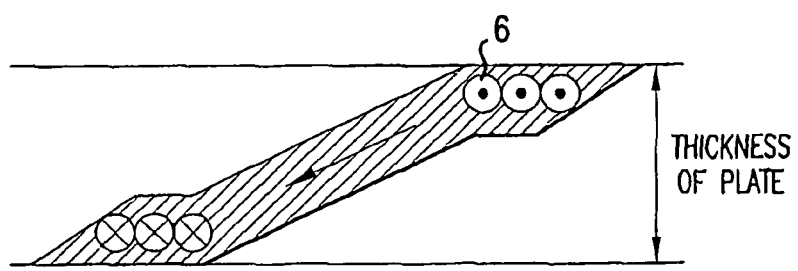
Figure 5:
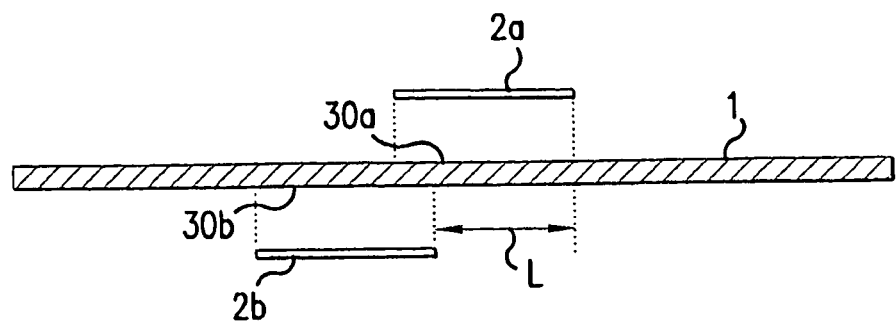
FIG. 5 is an explanatory diagram that defines a distance between upper and lower induction coils in the present invention.
Figure 7:
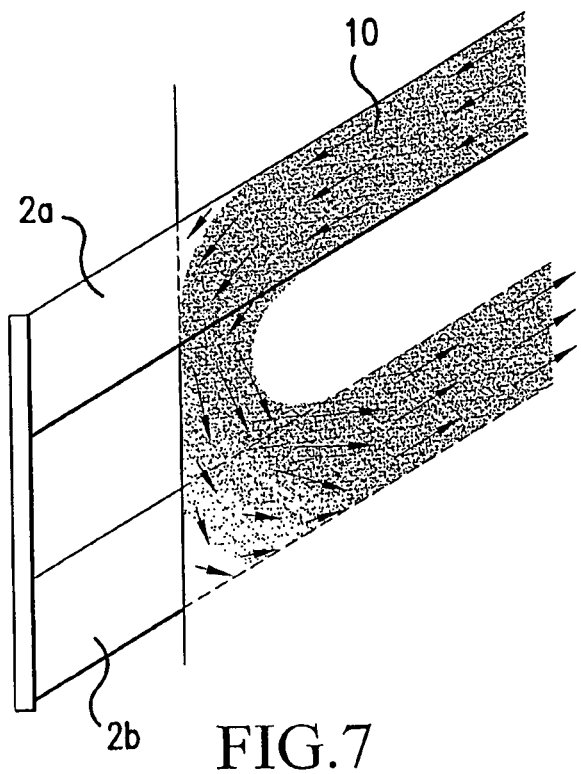
FIG. 7 is a schematic diagram illustrating the state of an induced current flow in the edge area of the metal plate caused by the induction heating apparatus of the present invention.

When the upper and the lower induction coils are respectively oblique to the transverse direction in the edge area, overheating at the edge area can be effectively restrained relative to induction coils that are not oblique. This will be explained with reference to FIG. 7. FIG. 7 is a schematic diagram illustrating the state of the induced current flow in the left edge area of the metal plate in FIG. 6 viewed from above the metal plate. An induced current 10 on the upper side and lower side of the metal plate flows in the opposite direction to a primary current passing through the induction coil where a width of the induced current is almost the same as a width of a projected image of the corresponding induction coil 30a or 30b. The induced current passing near the edge of the metal plate tends to take the flow path closer to the central area of the metal plate, so that the inductance between the induced current and the primary current running through the induction coil located at the edge of the metal plate can be reduced. In other words, an upper induced current induced by the upper induction coil and a lower induced current induced by the lower induction coil try to connect to each other along the shortest path, although some part of the current flows at the edge. This provides a relatively wider passage of induced current flow near the edge of the metal plate to restrain the increase of current density near the edge. Thus, when the upper and lower induction coils have an oblique portion to the transverse direction at the edge area, overheating at the area can be effectively restrained relative to an induction coil that does not have such an oblique portion.

The inventors of the present invention further investigated the proper oblique angle (Θ in FIG. 6). A relationship between a degree of overheating in the edge area, i.e., (the temperature at the edge area)–(the temperature in the central area), and an oblique angle Θ was experimentally investigated using the induction heating apparatus shown in FIG. 6. The metal plate that was used was a non-magnetic SUS304 stainless steel plate (thickness: 0.2 mm, width: 600 mm). A traveling speed of the metal plate was 2 m/min. the AC power supply (not shown) was 25 KHz and a capacitor had a capacitance of 100 KW that was adjusted to match the induction coil that was used.

The induction coil that was used was a single turn (surrounding the steel plate to be heated) of a water-cooled copper plate that was constructed of a copper plate (thickness: 5 mm, width: 100 mm) and a water-cooling copper tube (outer diameter: 10 mm, inner diameter: g mm) attached to the copper plate on the side (outer side) opposite to the steel plate by brazing. In this experiment, "induction coil" included both the copper plate and the water-cooling copper tube, since the electric current also runs through the copper tube. A gap between the surface of the metal plate (SUS304 plate) and the induction coil (copper plate) was 50 mm. The distance L between the upper and lower induction coils was 200 mm.

The temperature of the steel plate at both the central area and edge area was measured at the exit of the induction heating apparatus using a two-dimensional infrared thermometer. In order to change the oblique angle Θ between the induction coil and the transverse direction of the metal plate, the induction coils are placed on a movable wooden base and the upper and lower induction coils are connected to an induction coil 9 arranged near the edge of the metal plate by selecting appropriate bolt holes from a plurality of holes formed in the water-cooled copper plate. TABLE 1 shows the results of a relationship between a degree of overheating in the edge area, i.e., (the temperature in the edge area)–(the temperature in the central area), and an oblique angle Θ.

TABLE 1

| oblique angle θ | degree of overheating in the edge area: (temperature in the edge area)- (temperature in the central area) |
|---|---|
| 0 degree | 90° C. |
| 5 degree | 76° C. |
| 10 degree | 25° C. |
| 30 degree | 6° C. |
| 50 degree | 32° C. |
| 60 degree | 40° C. |
| 70 degree | 80° C. |

From the results, it was concluded considering a practical temperature distribution tolerance that the oblique angle ranging from 10 degrees to 60 degrees is preferable. If the oblique angle Θ is 5 degrees or less, the prevention of overheating in the edge area of the metal plate is not sufficient, and if exceeding 60 degrees, the temperature in the edge area is also increased, since the heating time is increased even if the current density is lowered. A preferable specific oblique angle between 10 degrees and 60 degrees should be determined in advance based on the preexisting initial temperature difference between the temperatures at the edge area and in the central area of the metal plate to be heated. With regard to any preexisting initial temperature distribution, there could be three representative patterns, i.e., a metal plate having a flat temperature distribution (the same temperature at the central area and the edge area), a metal plate having a temperature distribution that is slightly lower at the edge area relative to the temperature in the central area, or a metal plate having a temperature distribution that is slightly higher at the edge area relative to the temperature in the central area.

As described above, it has been found that setting the induction coil oblique to the transverse direction of the metal plate can prevent overheating at the edge area. The inventors of the present invention farther investigated what length of oblique portion the induction coil should have in the edge area to be effective in preventing overheating. Specifically, with respect to an induction heating apparatus as shown in FIG. 8 of one embodiment of the present invention, how many millimeters of the oblique portion (represented by "y" in FIG. 8) should extend toward the inside (toward the central area) from the edge of the metal plate 1 in an area within 100 mm from the edge of the metal plate 1 where the temperature deviation tends to be prominent because of overheating.

Figure 8:
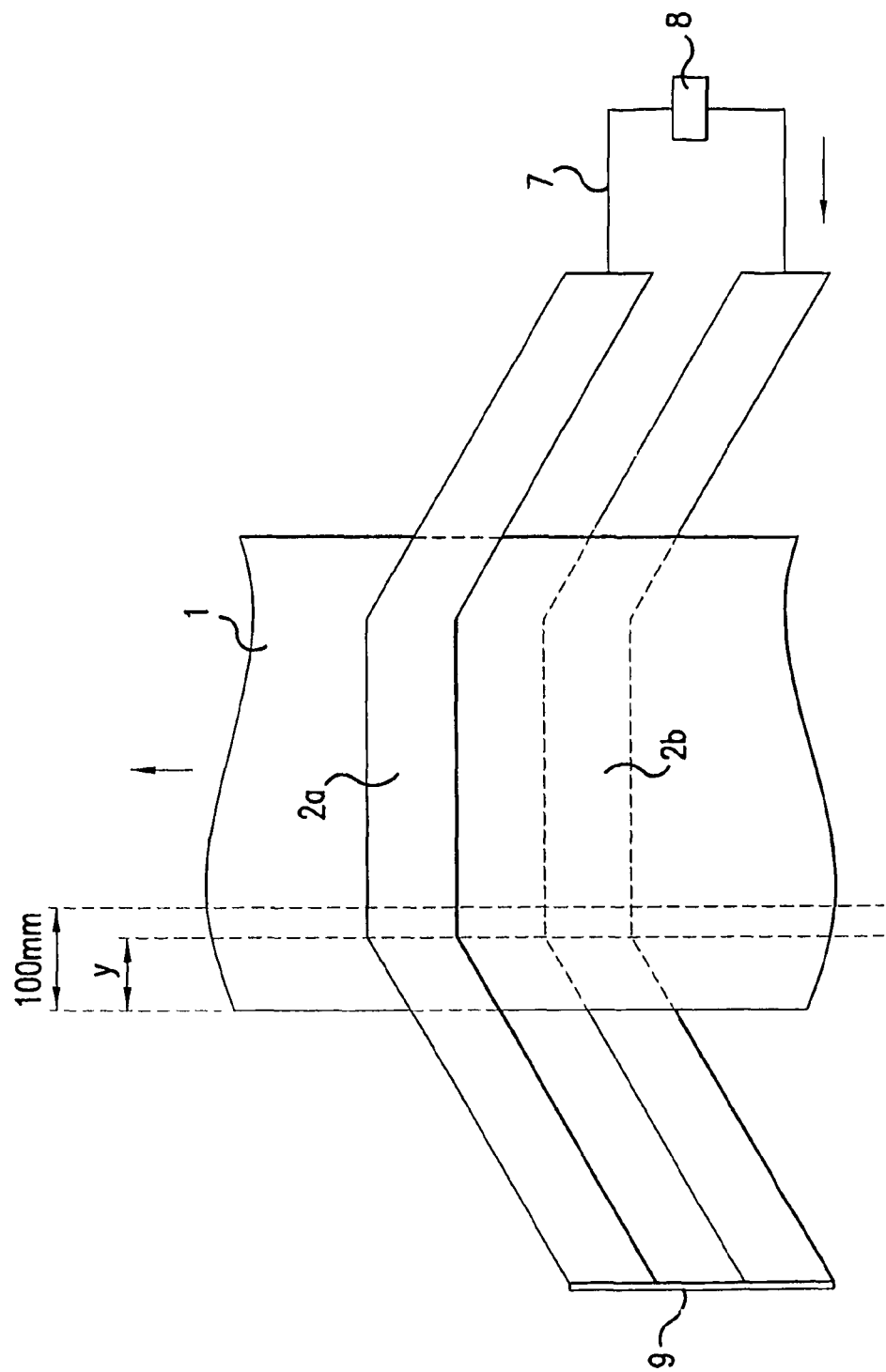
FIG. 8 is a schematic diagram of an embodiment of the present invention.

FIG. 8 is a plan schematic view showing one example of an induction heating apparatus of the present invention. In FIG. 8, an induction coil 2a located above the metal plate and another induction coil 2b located below the metal plate are located so as to be away from each other in the longitudinal direction of the metal plate. The induction coils 2a and 2b are also parallel to each other. The distance L in the longitudinal direction between the upper and lower induction coils in terms of the projected images is kept constant in the transverse direction. The upper induction coil 2a and the lower induction coil 2b in FIG. 8 are parallel to the transverse direction only in the central area and have an oblique (bent) portion respectively at the edge area where each of the induction coils stretches obliquely across the metal plate relative to the transverse direction. Reference numeral 7 represents a conductive member, 8 represents an AC power supply and 9 represents an induction coil located close to an edge (end) of the metal plate.

As a result of an investigation of the induction heating apparatus of FIG. 8, it was found that overheating in the edge area can be effectively restrained if the oblique portions of the induction coils extend 50 mm or more toward the inside from the edge of the metal plate. In other words, if the oblique portions of the induction coils that have an oblique angle ranging from 10 degrees to 60 degrees are located so as to cover the area within 50 mm from the edge of the metal plate, overheating at the edge area can be effectively restrained.

Figure 9:
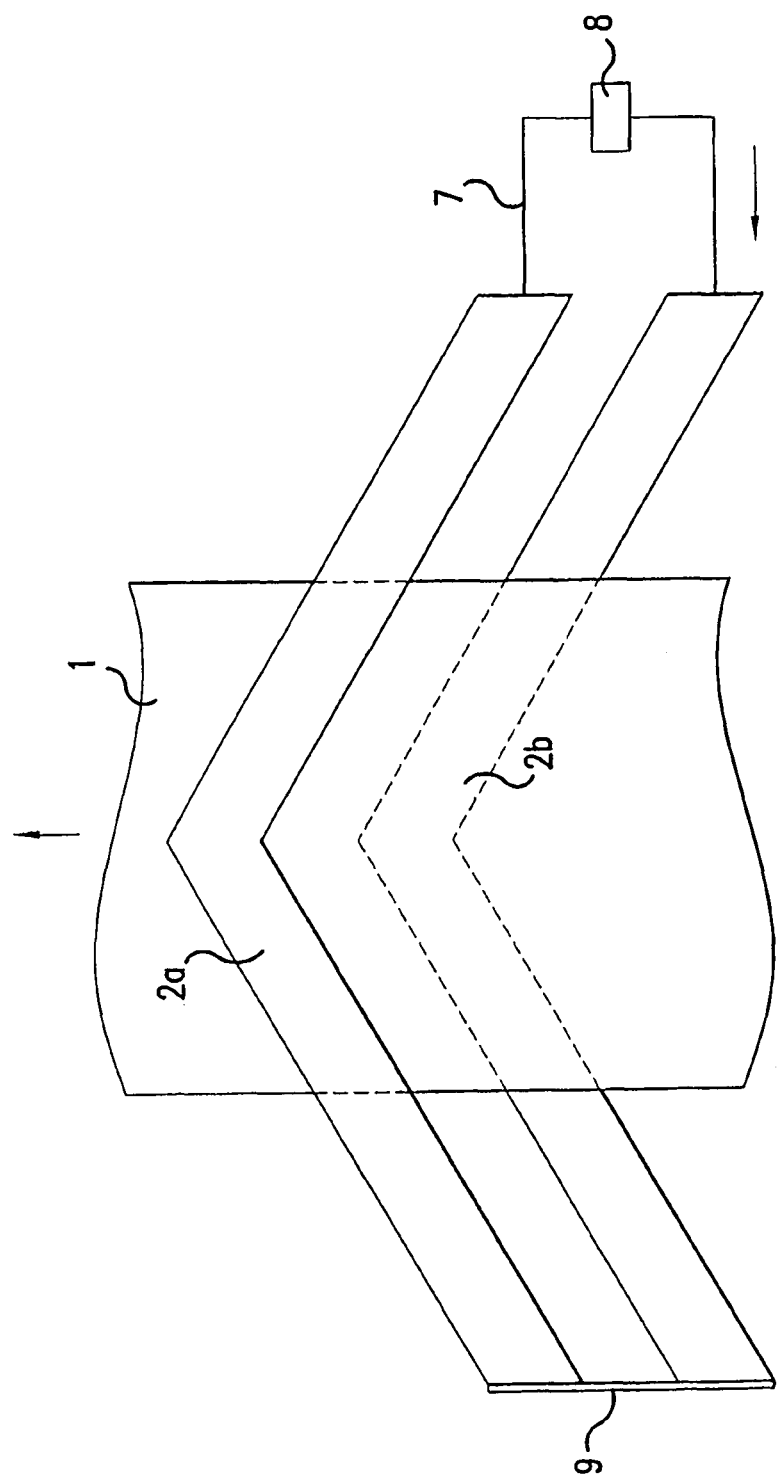
FIG. 9 is a schematic diagram of an embodiment of the present invention.
Figure 10:
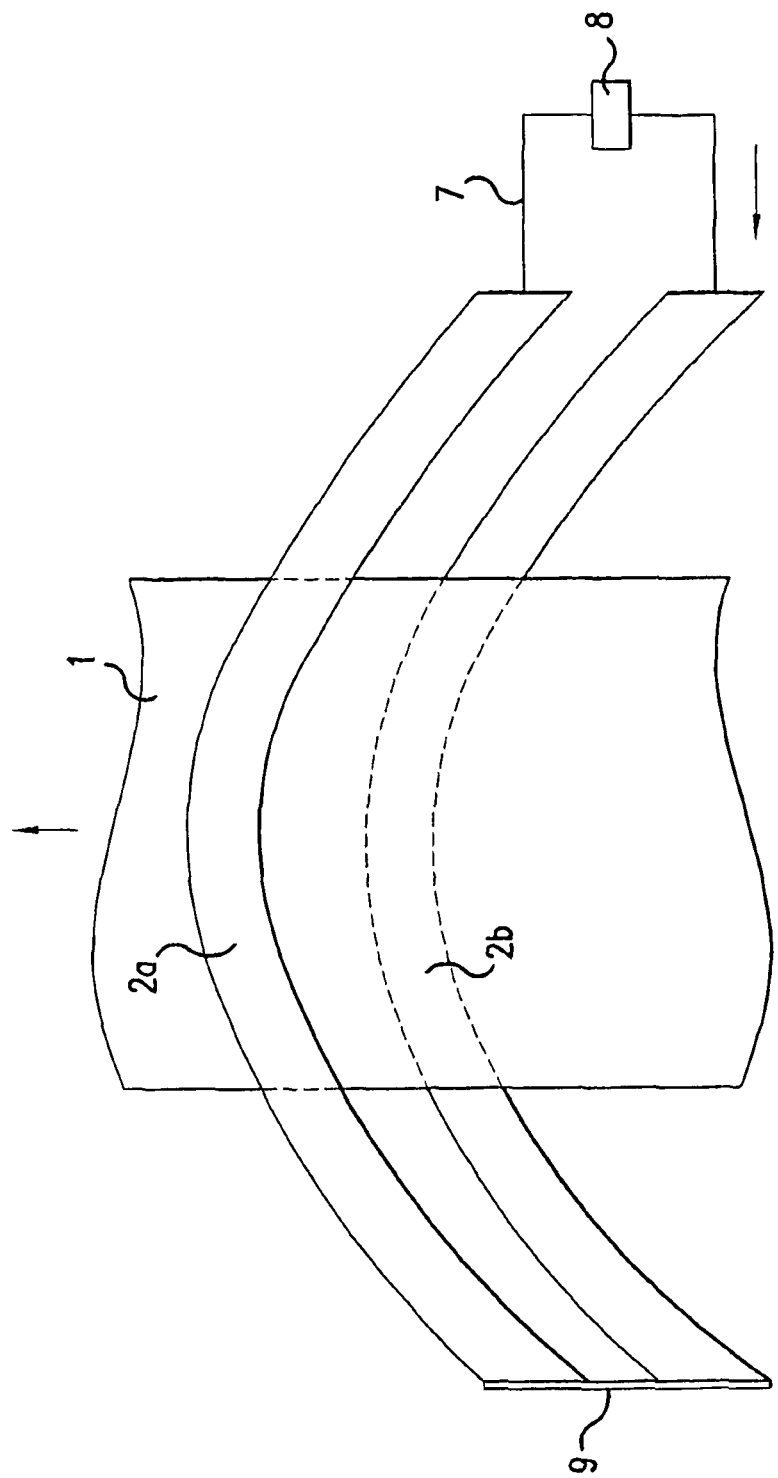
FIG. 10 is a schematic diagram of an embodiment of the present invention.

In the present invention, the distance in the longitudinal direction between the upper and lower induction coils is kept constant in the transverse direction. Furthermore, the upper induction coil 2a and the lower induction coil 2b each have a portion that is oblique to the transverse direction at an edge area of the metal plate. It should be noted; however, that the shape of the induction coil of the present invention is not limited to the shapes shown in FIGS. 6 and 8. The induction coils of the present invention could also be angle shaped (dogleg shaped) as shown in FIG. 9 and arc shaped as shown in FIG. 10. In FIGS. 9 and 10, reference numeral 2a represents an upper induction coil located above the metal plate 1, reference numeral 2b represents a lower induction coil located below the metal plate 1, reference numeral 7 represents a conductive member, reference numeral 8 represents an AC power supply and reference numeral 9 represents an induction coil located close to an edge (end) of the metal plate. The upper and lower induction coils are parallel to each other; however, the induction coils do not have to be bilaterally symmetrical with respect to the center line of the metal plate.

In a practical operation, a width of the metal plate is changed and/or the metal plate snakes. The present invention can make it possible to improve a non-uniform temperature distribution in the transverse direction of the metal plate even when the metal plate to be heated is changed in width and/or snakes while traveling. As shown in FIG. 6, the oblique angle at the edge area does not change when a width of the metal plate changes from "I-I'" to "II-II'" and/or snakes, i.e., the position of the edge 1 of the metal plate fluctuates in the transverse direction.

In another embodiment of the present invention, the distance between the upper induction coil and the lower induction coil and/or a width of the induction coil is changeable. This embodiment will be described below with reference to the drawings.

Since the heat divergence by an induction heating apparatus is proportional to a square of the current density and to the heating time, adjusting the distance between the upper and lower induction coils and/or a width of the induction coil can control an amount of heat divergence. In order to obtain a necessary heat divergence in a practical operation, it is possible to determine the distance and/or the width of the induction coil in advance through electromagnetic field analysis. However, because of fluctuations in a previous process, a metal plate to be fed into the induction heating apparatus of the present invention may have an initial temperature variation. Therefore, the necessary heat divergence may not be obtained, even if the predetermined amount of distance and/or width of the induction coil are adopted. An induction heating apparatus of the present invention can make it possible to obtain a desired temperature independently of the preexisting temperature state given by a previous process by adjusting the distance to the temperature variation of the metal to be fed in.

Figure 11:
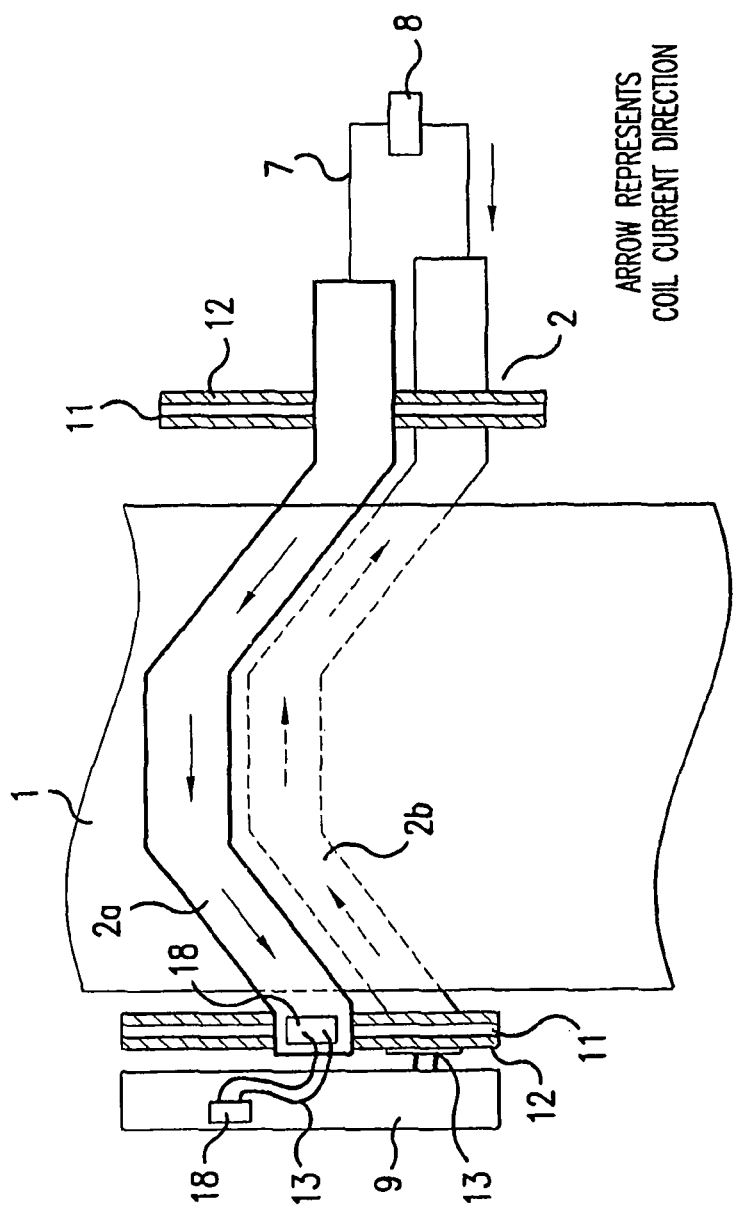
FIG. 11 is a schematic diagram of an embodiment of the present invention.
Figure 12:
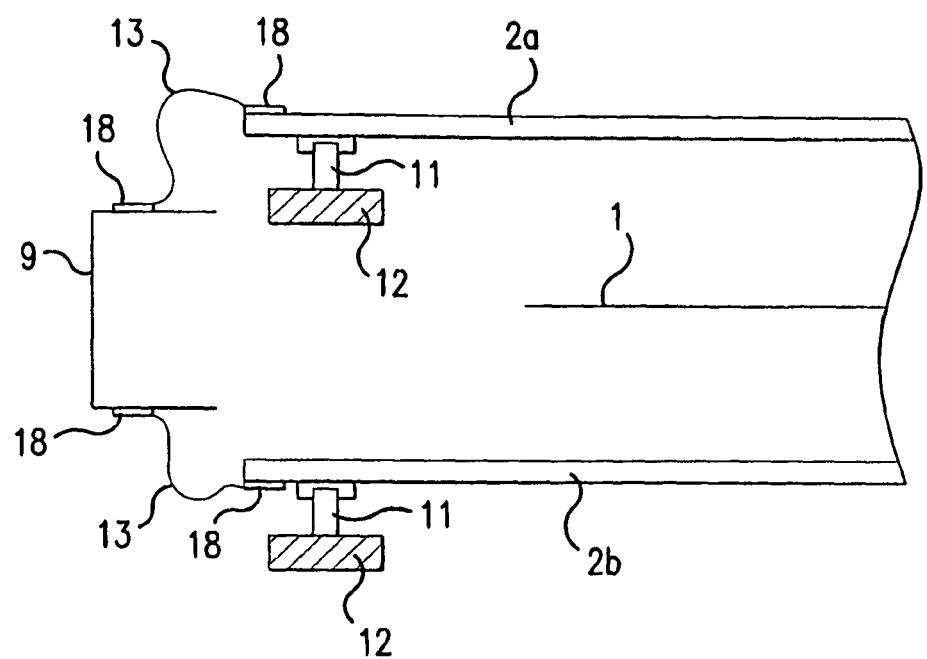
FIG. 12 is a schematic cross sectional view of FIG. 11.

FIG. 11 shows an upper induction coil 2a and a lower induction coil 2b each of which is slidably mounted on a pair of guide rails 11 fixed on a pair of bases 12 that extend in the longitudinal direction of a metal plate 1. FIG. 12 is a cross-sectional view of FIG. 11. Well known means for moving the induction coil (not shown in FIG. 11) such as an air cylinder, a hydraulic cylinder or a motor-driven cylinder can be used. Although FIG. 11 shows both upper and lower induction coils being movably mounted, it is also acceptable that either the upper coil or the lower coil is movable. Insulation materials such as ceramics and/or resins are preferable as materials for the base 12 and/or the rail II, since they are placed in a strong magnetic field in the vicinity of the induction coil. When a metal is used in some applications, it is required that a non-magnetic metal such as stainless steel, brass or aluminum be used. In addition, the base and the rail should be located distant as far as possible from the induction coil and should be water-cooled to prevent from being heated by the induced current. In view of this, the upper and lower induction coils 2a, 2b are connected to a water-cooled connector 9 via a movable conductive member 13 such as a water-cooled cable. Reference numeral 18 represents a connecting terminal of the copper plate.

In FIG. 11, an upper induction coil 2a located above the metal plate 1 and a lower induction coil 2b located below the metal plate 1 are located so as to be away from each other in the longitudinal direction of the metal plate and are parallel to each other. The distance L in the longitudinal direction between the upper and lower induction coils is kept constant in the transverse direction.

The upper induction coil 2a and the lower induction coil 2b are parallel to the transverse direction only in the central area and have an oblique (bent) portion respectively at the edge area where each of the induction coils stretches obliquely across the metal plate relative to the transverse direction. A necessary amount of heat divergence from the induction heating can be obtained by adjusting the distance between the upper and lower induction coils, since the heat divergence becomes larger as the distance becomes larger. The distance can be changed according to the temperature of the metal plate, which is measured by a thermometer located upstream of the induction heating apparatus.

Figure 13:
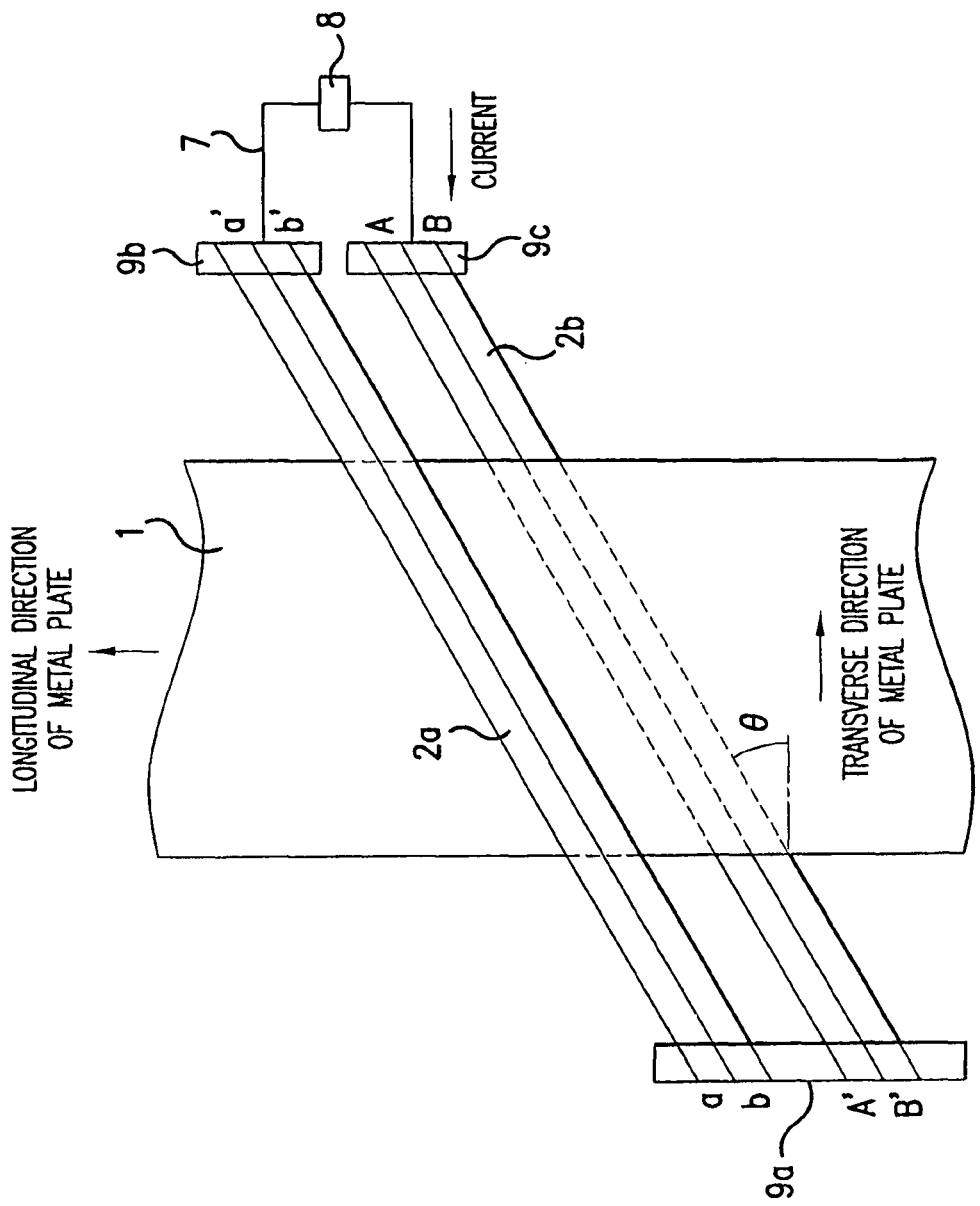
FIG. 13 is a schematic diagram of an embodiment of the present invention.

FIG. 13 shows another embodiment of the present invention for making the distance between the upper and lower induction coils changeable. In FIG. 13, an upper induction coil includes a plurality of edge area conductors a-a' and b-b' each of which is insulated and independent from each other. Each of the edge area conductors a-a' and b-b' is selectably connected to a central area connecting conductor 9b. The selectable connection can be performed using any well-known contact controller (not shown in FIG. 13) such as an electromagnetic contactor, an air cylinder or a motor-driven cylinder.

The lower induction coil includes a plurality of edge area conductors A-A' and B-B' each of which is insulated and independent from each other. Each of the edge area conductors A-A' and B-B' is selectably connected to a central area connecting conductor 9c. A contact controller is not shown in FIG. 13.

In FIG. 13, an upper induction coil located above the metal plate 1 and a lower induction coil located below the metal plate 1 are located so as to be away from each other in the longitudinal direction of the metal plate and are parallel to each other. The distance L in the longitudinal direction between the upper and lower induction coils is kept constant in the transverse direction. The upper induction coil and the lower induction coil have an oblique (bent) portion respectively at the edge area where each of the induction coils stretches obliquely across the metal plate at an oblique angle θ relative to the transverse direction.

In the embodiment of FIG. 13, the induction coil is normally constructed by connecting conductors 9c, B-B', 9a, b-b' and 9b together. When a larger amount of heat divergence is needed, the induction coil is reconstructed by connecting conductors 9c, B-B', 9a, a-a' and 9b together so as to increase the distance between the upper and lower induction coils.

In the embodiment of FIG. 13, to control the amount of heat divergence, a cross-sectional area of the conductor can be increased/decreased and/or a width of either the upper induction coil or the lower induction coil can be changed in addition to changing an amount of the distance between the upper and lower induction coils. For example, both of the conductors a-a' and b-b' can be selected together as the conductors to be energized.

The distance can be changed according to the temperature of the metal plate measured by a thermometer located upstream of the induction heating apparatus. A temperature deviation in the metal plate {(the temperature at the edge area)-(the temperature at the central area)} was examined using an induction coil constructed as shown in FIG. 8. The metal plates that were examined were non-magnetic SUS304 steel plates (thickness: 0.2 mm, width: 600 mm and 800 mm). The traveling speed of the steel plate was 2 m/min. The AC power supply (not shown) of 25 KHs and a capacitor having a capacitance of 100 KW was used. The capacitance of the capacitor was adjusted to match the induction coil to be used. An induction coil used was a single turn (surrounding the steel plate to be heated) of a water-cooled copper plate that was constructed of a copper plate (thickness: 5 mm, width: 100 mm) and a water-cooling copper tube (outer diameter: 10 mm, inner diameter: 8 mm) attached to the copper plate on the side (outer side) opposite to the steel plate by brazing. In this example, "induction coil" includes both the copper plate and the water-cooling copper tube, since the electric current also runs through the copper tube. A gap between the steel plate to be heated and the induction coil was 50 mm. The distance L between the upper induction coil and the lower induction coil was 200 mm. An oblique angle between the induction coil and transverse direction of the steel plate was 30 degrees. The central area of the induction coil was 200 mm long and parallel to the transverse direction of the steel plate. The temperature of the steel plate in the edge area was measured at a position 50 mm away from the edge of the steel plate using an infrared thermometer. TABLE 2 shows the temperature deviation with respect to both the 600 mm width plate and the 800 mm width plate.

TABLE 2

| Temperature deviation of 800 mm width steel plate | Temperature deviation of 600 mm width steel plate |
|---|---|
| 6° C. | 6° C. |

The results show that overheating at the edge area of the steel plate is sufficiently restrained and the temperature deviation remains unchanged when the width of the steel plate changes.

The present invention is capable of heating a metal plate with high efficiency, even where the temperature of the metal plate is high above the Curie point, the metal plate is thin and/or the metal plate is made of a non-magnetic, non-ferrous metal with a low specific resistance such as aluminum or copper. The present invention is further capable of improving a non-uniform temperature distribution in the transverse direction of the metal plate, in particular overheating at an edge area of the metal plate. The present invention can make it easier to realize a desired temperature distribution even when the width of metal plate to be heated is changed without preparing a plurality of induction coils to cope with the width change. In addition, the present invention can improve a non-uniform temperature distribution caused by snaking of metal plate.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An induction heating apparatus for heating a steel sheet traveling in a longitudinal direction that is in a non-magnetic state at a temperature above the Curie point or non-magnetic metal plate, comprising:
 an induction coil for surrounding the steel sheet or the metal plate, said induction coil including an upper induction coil for being located above the steel sheet or the metal plate and a lower induction coil for being located below the steel sheet or the metal plate, said upper induction coil being spaced from said lower coil in the longitudinal direction of the steel sheet or the metal plate, said spacing being a constant longitudinal distance across a transverse direction of the entire width of the steel sheet or of the metal plate,
 wherein each of the upper induction coil and the lower induction coil is arranged obliquely at an edge area of the steel sheet or the metal plate so as to form an oblique angle with the transverse direction of the steel sheet or the metal plate.

2. The induction heating apparatus according to claim 1, wherein the longitudinal distance between a same respective edge of the upper induction coil and the lower induction coil is 0.2 to 6 times the width of a wider of the upper and lower induction coils, projected along the traveling direction of the steel sheet or metal plate, or 0.2 to 6 times the width, projected along the traveling direction of the steel sheet or metal plate, of either coil when the width of the lower induction coil is the same as the width of the upper induction coil.

3. The induction heating apparatus according to claim 2, wherein the oblique angle ranges from 10 degrees to 60 degrees.

4. The induction heating apparatus according to claim 3, wherein the distance between the upper induction coil and the lower induction coil is adjustable.

5. The induction heating apparatus according to claim 4, wherein at least one of the upper induction coil and the lower induction coil is movable in the longitudinal direction of the metal plate.

6. The induction heating apparatus according to claim 4, wherein at least one of the upper induction coil and the lower induction coil is constructed of a plurality of conductors so that the distance between the upper induction coil and the lower induction coil is adjustable by selecting a specific conductor among the plurality of conductors as the conductor to be energized by alternating current.

7. The induction heating apparatus according to claim 5, further comprising a guide rail that extends along the metal plate in the longitudinal direction, at least one of the upper induction coil and the lower induction coil being movably mounted on the guide rail.

8. The induction heating apparatus according to claim 3, wherein a width of at least one of the upper induction coil and the lower induction coil is changeable.

9. The induction heating apparatus according to claim 8, wherein at least one of the upper induction coil and the lower induction coil is constructed of a plurality of conductors and the width of at least one of the upper induction coil and the lower induction coil is changeable by selecting one or more specific conductors among the plurality of conductors as the conductors to be energized by alternating current.

10. The induction heating apparatus according to claim 1, said induction coil further comprising an edge induction coil connecting between said upper and lower induction coils, said edge induction coil for being located at an edge of the metal plate.

11. The induction heating apparatus according to claim 1, wherein the apparatus further comprises:
an AC power supply, wherein said upper induction coil is connected at one end thereof to the AC power supply and said lower induction coil is connected at one end thereof to the AC power supply.

12. The induction heating apparatus according to claim 11, said induction coil further comprising an edge portion connecting between said upper and lower portions of the induction coil at ends of the upper and lower portions of the induction coil opposite to the AC power source, said edge portion for being located at an edge of the metal plate.

13. The induction heating apparatus according to claim 1, wherein the apparatus further comprises: an AC power supply, wherein said upper induction coil and said lower induction coil are connected to the AC power supply.

* * * * *